UNITED STATES PATENT OFFICE.

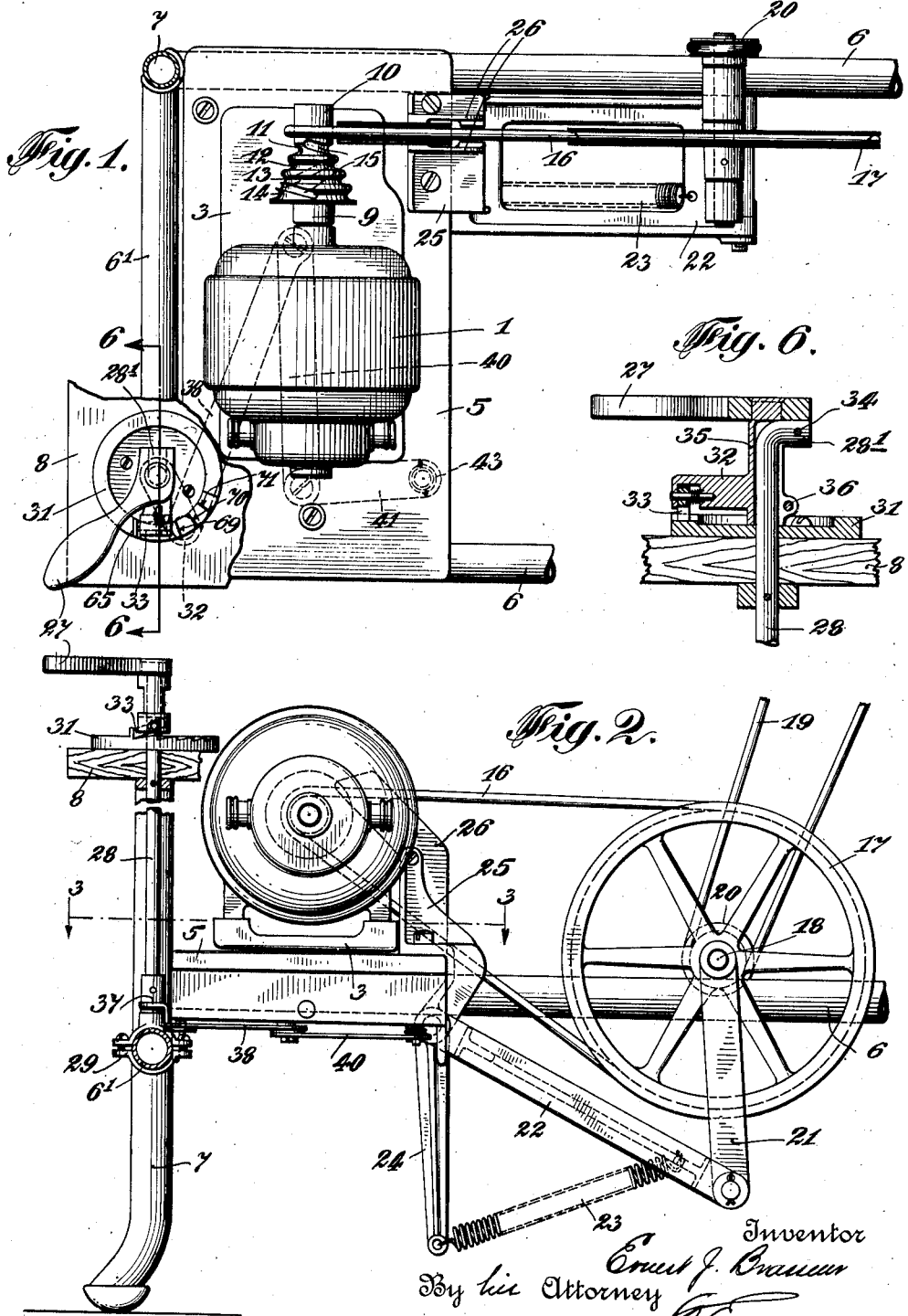

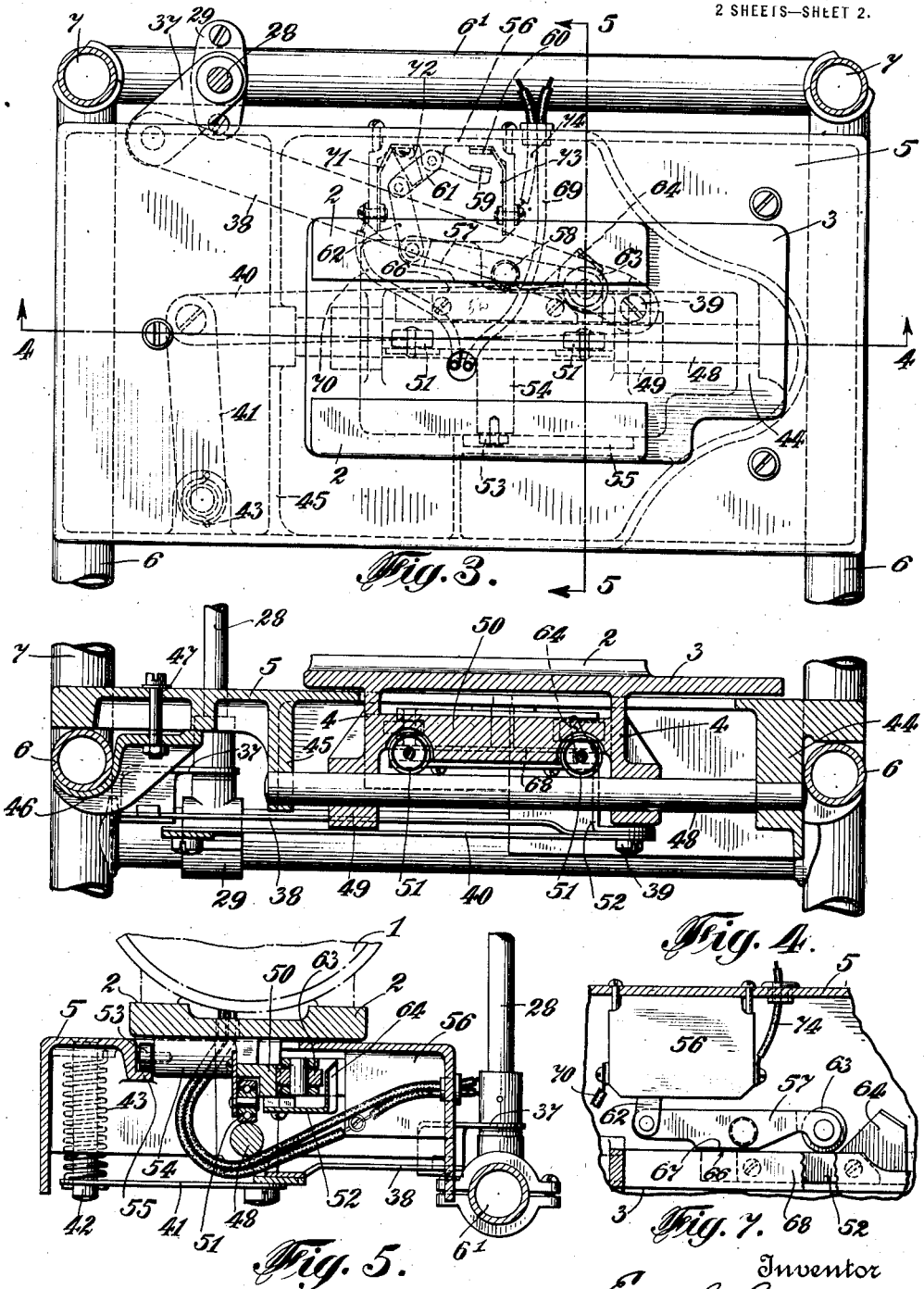

ERNEST J. BRASSEUR, OF CHICAGO, ILLINOIS, ASSIGNOR TO A. B. DICK COMPANY, OF CHICAGO, ILLINOIS, A CORPORATION OF ILLINOIS.

STARTING AND SPEED-CONTROLLING DEVICE.

1,388,449.  Specification of Letters Patent.  Patented Aug. 23, 1921.

Application filed June 12, 1920. Serial No. 388,484.

*To all whom it may concern:*

Be it known that I, ERNEST J. BRASSEUR, a citizen of the United States, residing in the city of Chicago, county of Cook, and State of Illinois, have invented certain new and useful Improvements in Starting and Speed-Controlling Devices, of which the following is a specification.

My invention relates to devices for starting and stopping and varying the speed of shafts or other machine elements. My invention is particularly designed for controlling the speed of and starting and stopping of a rotary duplicating machine, driven by a constant speed electric motor, but obviously it may be used for controlling other forms of apparatus as well.

My invention provides a simple and effective means whereby a mechanical element, such as a shaft, may be started and stopped and given various rates of speed by the operation of a single controlling lever or the like. I accomplish this by mounting a small constant speed electric motor in such manner that the same may be moved forward and back axially. The motor shaft is provided with a series of cone or stepped pulleys of increasing diameter, over any one of which a belt connection runs to drive the driven element. A helical groove is formed around these pulleys from the smallest to the largest one, so that as the pulleys are shifted axially, with the motor, a round belt will be shifted from one pulley to another to increase or decrease the speed of the driven part. The apparatus is also so arranged that a motor starting switch will be closed as the belt is shifted from an idle pulley to the first one of the stepped pulleys, during the first axial movement of the motor, to start the motor. Correspondingly, the switch is opened to stop the motor, when the motor has been shifted to the limit from the opposite direction so as to shift the belt from the smallest stepped pulley to the idle pulley.

The objects of my invention are to provide improved combinations of parts and forms of construction adapted to produce simple and effective mechanism of the character briefly described above.

In order that a clearer understanding of my invention may be had, attention is hereby directed to the accompanying drawings forming part of this application and illustrating one embodiment of my invention. In the drawings, Figure 1 represents a top plan view of apparatus embodying my invention, certain parts being shown broken away, Fig. 2 is a side elevation of the apparatus shown in Fig. 1, Fig. 3 is a horizontal section on an enlarged scale taken on line 3—3 of Fig. 2 showing the plate on which the motor is carried, various parts beneath the plate being shown in dotted lines, Fig. 4 is a vertical longitudinal section taken on line 4—4 of Fig. 3, Fig. 5 is a vertical cross section taken on line 5—5 of Fig. 3, Fig. 6 is a partial vertical section taken on line 6—6 of Fig. 1 and Fig. 7 is a detail view of the starting switch operating mechanism, shown partly in plan and partly in horizontal section.

Referring to the drawings, the motor 1 is supported on flanges 2, 2 of a casting comprising a top horizontal plate 3 having downwardly extending lugs 4, 4. Plate 3 with the motor mounted thereon is adapted to reciprocate longitudinally of a plate 5 which is secured across the lower longitudinal frame members 6, 6 of a table or stand having vertical members or legs 7 which support a top 8.

The shaft 9 of the motor is provided with a cylindrical end portion 10 which may serve as an idle belt pulley. Between the cylindrical portion 10 of the shaft and the motor there is provided a series of stepped pulleys such as 11, 12, 13 and 14 or any desired number of belt pulleys of increasing diameter. These pulleys are provided with flanges for separating the same.

A spiral groove 15 is cut entirely around the series of pulleys to cut through all of the flanges separating the same. A round belt 16 is adapted to run over one of the pulleys and around a large belt pulley 17 mounted on shaft 18. Another belt connection 19 leads from the small belt pulley 20 on shaft 18 to the apparatus to be driven, for example, a rotary duplicating machine mounted on table 8.

Shaft 18 may be carried by an arm 21 which is pivotally connected at its lower end to an arm 22 which is pivoted to the shelf or lower horizontal support 5. Arm 22 is connected by spring 23 to a rigid bracket 24 extending downwardly from shelf 5. This spring serves to keep the belts under tension. A bracket 25, which may be integral with arm 24, is mounted on shelf 5 and is provided with a pair of upwardly extending arms 26 between which the belt 16 extends, to aline the same at all times with the pulley 17.

The operation of the device is controlled by a hand lever 27 which is rotatable above table 8 and is secured to the upper end of a vertical rod 28 which has bearings in table 8 and in a socket extending upwardly from a clamp 29 surrounding one of the lower cross frame members 6' of the table or stand.

The table top 8 is provided with a circular ratchet plate 31 and the hand lever 27 is provided with an arm 32 by which a pivoted pawl 33 is carried, the pawl being spring-pressed downwardly. The hand lever 27, together with arm 32, are so mounted that they may be swung to a limited extent in a vertical plane about the top of rod 28 in order to allow the pawl to be swung over the ratchet teeth of plate 31, in either direction, without touching the same. This is accomplished in the form of device illustrated by bending the upper end of rod 28 at right angles as is shown at 28'. The handle member 27 is pivotally connected to the top portion of rod 28 by a pin 34 as shown in Fig. 6. The sleeve 35, which is integral with and secured to arm 32 and handle 27, is open on the side opposite arm 32 and is provided with a cross pin 36 extending across the lower end of the opening in the sleeve to form a stop to limit upward movement of arm 32.

Rod 28 is provided adjacent its lower end with an arm 37 which is pivotally connected with a link 38 extending beneath frame 5. Link 38 is pivotally connected at its opposite end, at 39, to a similar link 40 which is pivotally connected at its opposite end to a short arm 41. The opposite end of arm 41 is pivotally mounted on the end of a post 42 extending downwardly from the under side of the frame member 5. A spring 43 surrounds post 42 and bears on arm 41 in such a direction as to tend to move links 38 and 40 to the left, referring to Fig. 3, and accordingly tending to move handle 27 back, that is, in the right hand direction, toward its initial position shown in Fig. 1.

The frame member 5, as stated, is preferably a casting having a downwardly extending flange 44 at one end and a transverse downwardly extending flange 45 adjacent the other end. The casting may be supported on the longitudinal frame members 6 and clamped to one of the same by a clamp 46 and a screw 47.

The shaft 48 is supported in flanges 44 and 45 of frame 5. The downwardly extending flanges 4, 4 of the motor carrying member 3 are provided at their lower ends with lugs 49, 49, through openings in which shaft 48 extends so that member 3 may be guided in its reciprocating movements.

The flanges 4, 4 of member 3 are connected by a longitudinally extending portion 50. This portion of the frame 3 is provided with anti-friction rotatable supporting means 51 adapted to run on top of the shaft 48 to support the motor carriage 3 during its reciprocating movements. A strip 52 is secured to the portion 50 of the motor support and is bent to have its opposite end portion mounted on the pin 39 connecting links 38 and 40. This accordingly provides the connection by which the carriage 3 is reciprocated as handle 27 is rotated in one direction or the other. Carriage 3 is provided with a support parallel to shaft 48 by the provision of a roller 53 mounted on a pin carried by a transverse lug 54 of carriage 3, this roller running on a flange 55 of the frame 5.

The motor starting switch is inclosed within a casing 56 secured within casting 5. A lever 57 is pivoted intermediate its ends on a vertical pin 58 extending downwardly from the web of casting 5. Electrical contacts 59 and 60 are provided within casing 56, the movable contact 59 being connected in any suitable way to the end of lever 57 so that oscillation of the latter in one direction will close the contacts and oscillation in the opposite direction will open the same. As shown, the contact 59 may be carried by a bell crank lever 61 which is pivotally secured to one end of lever 57 by a link 62.

The end of lever 57 opposite to that at which link 62 is connected is provided with a pin on which a roller 63 is rotatably mounted. The strip 52 secured to the longitudinally extending portion 50 of the motor carriage has a portion bent upwardly therefrom to form a cam surface 64.

The reciprocating carriage 3 has an initial position, shown in Fig. 1, in which the motor is at rest, the starting switch 59, 60 being open, and belt 16 engaging the surface 10 of the motor shaft. In this position pawl 33 engages the end tooth or stop 65 of the ratchet plate 31. As hand lever 27 is moved its first step in a left handed direction, referring to Fig. 1, carriage 3 is shifted axially sufficiently to cause belt 16 to drop into the first or smallest one, 11 of the series of stepped pulleys on the motor shaft. When the carriage is in its initial position, as shown in Figs. 1 and 3 of the drawings, cam 64 engages roller 63 so that lever 57 is held in the position in which contacts 59, 60 are open. As carriage 3 makes its first movement to the right, referring to Fig. 3, cam 64 moves away from roller 63 and at the same time an edge surface 66 of the reciprocating carriage engages against the surface 67 of lever 57, to the right of the pivot pin 58, referring to Fig. 3. The surface 66 referred to is formed on a flange 68 which is in alinement with and above the strip 52 as is indicated in the detail drawing, Fig. 7. This engagement of surface 66 of the reciprocating carriage with the surface 67 of lever 57 immediately swings lever 57 into parallel relation with surface 66, as shown in Fig. 7, the left hand end of lever 57 descending from the position shown in Fig. 3, link 62 depressing the adjacent end of bell crank lever 61 so as to cause engagement between the contacts 59 and 60.

The motor 1 starts rotating immediately upon closing of the contacts 59 and 60, that is, as soon as belt 16 is shifted into the first pulley 11. The electrical current may be considered as passing from a suitable source through the conductor 69 to the motor and thence through conductor 70 to a contact strip 71 on the casing 56 and thence by a sliding contact 72 to lever 61. When the contacts 59 and 60 are closed, the circuit is completed through contact strip 73 and conductor 74 back to the source of power. The circuit connections described are, of course, merely illustrative.

The motor being thus started, it will be maintained in rotation at an approximately constant speed as long as pawl 33 is at least one notch away from the end stop 65 of ratchet plate 31. Lever 57 is maintained in this position by the sliding engagement of surface 66 of the reciprocating carriage with the surface 67 of lever 57 during the entire movement of carriage 3 until hand lever 27 is again returned to its initial position. As the hand lever approaches its initial position, belt 16 is shifted from pulley 11 on to surface 10 and cam 64 will again ride on to roller 63 so as to swing lever 57 into the position indicated in Fig. 3 and to open the contacts 59 and 60, to stop the motor.

As hand lever 27 is rotated in a left handed direction the belt 16 will be shifted from one to another of the stepped pulleys 11, 12, etc., by means of the spiral groove 15 which extends across the pulleys and provides openings through the flanges which separate the pulleys to permit the belt to pass from one pulley to the next. As the belt moves on to a larger pulley the driven pulley 17 will rise, against the pressure of spring 23, sufficiently to enable the shift to be made, the belt being maintained at suitable tension. The belt guiding device 26 keeps the belt at all times in alinement with the driven pulley 17.

The spring 43 acts on arm 41 and through links 40 and 38 on vertical rod 28 and hand lever 27 with the effect of pressing the hand lever constantly in a right handed direction, that is, toward its starting position. When hand lever 27 has been moved in a left handed direction so that pawl 33 passes over tooth 69 of the pawl plate 31, belt 16 is located on pulley 11 and when pawl 33 has passed the next tooth 70 of the pawl plate the belt will be riding on pulley 12, etc. If hand lever 27 is released when the belt is in alinement with pulley 12, for example, spring 43 will press pawl 33 immediately against tooth 70 of the ratchet plate to hold carriage 3 in this adjusted position. Correspondingly, if the belt is riding on pulley 13, spring 43 will act to press pawl 33 against the tooth 71 of the ratchet plate. The hand lever may be returned to its initial position by raising the same slightly to cause it to pivot about pin 34 so as to enable pawl 33 to clear the ratchet teeth on the return movement.

It should be understood that my invention is not limited strictly to the details of construction described but is as broad as is indicated by the accompanying claims.

What I claim is:

1. In a device of the character described, the combination of a motor, a motor shaft having stepped pulleys thereon with an inclined groove formed across the same, a driven pulley, a belt extending around said shaft and driven pulley, and means for shifting said motor axially in one direction or the other while it is running, to shift said belt from one of said stepped pulleys to another.

2. In a device of the character described, the combination of a driving shaft having stepped pulleys thereon with interrupted flanges between the pulleys, means for rotating said shaft, a driven pulley, a belt extending around said shaft and driven pulley, and means for shifting said shaft axially in one direction or the other, while it is rotating, to shift said belt from one of said stepped pulleys to another.

3. In a device of the character described, the combination of a driving shaft having stepped pulleys thereon with interrupted flanges between the pulleys and an additional belt surface adjacent the smallest of said pulleys, a driven pulley, a belt extending around said shaft and driven pulley, means for shifting said shaft axially in one direction or the other, and means for starting said shaft in rotation as it shifts from its initial position in which the belt engages said additional surface to the position in which it engages said smallest pulley, and for stopping said rotation when said shaft returns to said initial position.

4. In a device of the character described the combination of a driving shaft having stepped pulleys thereon with an inclined groove formed across the same, a driven pulley, a belt extending around said shaft and driven pulley, a hand lever, and connections from said hand lever for shifting said shaft axially in one direction or the other, so that, when said shaft is rotating, said belt will be shifted from one of said stepped pulleys to another.

5. In a device of the character described, the combination of a driving shaft having stepped pulleys thereon with an inclined groove formed across the same, a driven pulley, a belt extending around said shaft and driven pulley, a motor connected to drive said shaft, a hand lever, and means operable from said hand lever for starting and stopping said motor and for shifting said shaft axially, so that when said shaft is rotating, said belt will be shifted from one of said stepped pulleys to another.

6. In a device of the character described, the combination of a motor, a motor shaft having stepped pulleys thereon with an inclined groove formed across the same, a driven pulley, a belt extending around said shaft and driven pulley, a hand lever, and connections from said hand lever to said motor for shifting said motor axially, so that, when said motor is rotating, said belt will be shifted from one of said stepped pulleys to another.

7. In a device of the character described, the combination of a motor, a motor shaft having stepped pulleys thereon with an inclined groove formed across the same, a driven pulley, a belt extending around said shaft and driven pulley, a hand lever, a starting switch for said motor, connections from said hand lever to said motor for shifting said motor axially, said motor having an initial non-rotating position, and means for closing said switch to start said motor as the latter moves a short distance from its initial position and the belt rides on the smallest one of said stepped pulleys.

8. In a device of the character described, the combination of a support, a carriage mounted to reciprocate thereon, a motor on said carriage having a shaft extending longitudinally thereof, with stepped pulleys on said shaft, a fixed belt guideway, a belt extending through said guideway and around one or another of said pulleys, a hand lever, and connections therefrom to said carriage for reciprocating said carriage.

9. In a device of the character described, the combination of a support, a carriage mounted to reciprocate thereon, a motor on said carriage having a shaft extending longitudinally thereof, with stepped pulleys on said shaft, a driven pulley, a belt extending around said shaft and driven pulley, a hand lever, connections therefrom for reciprocating said carriage, a pawl movable with said lever, a ratchet plate over which said pawl moves with said lever, and spring means for holding said carriage in an adjusted position with said pawl engaging a tooth of said ratchet plate.

10. In a device of the character described, the combination of a support, a carriage mounted to reciprocate thereon, a motor on said carriage having a shaft extending longitudinally thereof, with stepped pulleys on said shaft, a driven pulley, a belt extending around said shaft and driven pulley, said carriage having an initial position, a lever, means for rocking said lever in one direction as said carriage moves from its initial position and in the opposite direction as said carriage returns to its initial position, a starting switch for said motor, means for closing said switch to start said motor as said lever is rocked in the first direction and for opening said switch as said lever is rocked in the opposite direction, and manually controlled means for reciprocating said carriage.

This specification signed and witnessed this 9th day of June, 1920.

ERNEST J. BRASSEUR.

Witnesses:
Wm. E. D. Orr,
Joseph Teal.